United States Patent
Kennedy et al.

(10) Patent No.: US 6,565,257 B1
(45) Date of Patent: May 20, 2003

(54) SUBMERGIBLE PUMPING SYSTEM WITH THERMAL SPRAYED POLYMERIC WEAR SURFACES

(76) Inventors: Steven C. Kennedy, 1316 Ridgewood, Bartlesville, OK (US) 74006; Thiam Hock Francis Tan, Blk 24. Simei Street 1. #05-12, Singapore 529946 (SG); Michael L. Taylor, 102 Hill View Crescent, Singapore 669495 (SG); Boon Hee Tan, Blk 427, Ang Mo Kio Ave 3. #10-2624, Singapore 560427 (SG)

( * ) Notice: Subject to any disclaimer, the term of this patent is extended or adjusted under 35 U.S.C. 154(b) by 0 days.

(21) Appl. No.: 09/645,988

(22) Filed: Jan. 10, 2000

Related U.S. Application Data

(63) Continuation of application No. 09/159,132, filed on Sep. 23, 1998, now Pat. No. 6,012,900.

(51) Int. Cl.$^7$ .............................................. F16C 32/06
(52) U.S. Cl. ....................................................... 384/122
(58) Field of Search ............................... 384/122, 306, 384/307, 308, 909

(56) References Cited

U.S. PATENT DOCUMENTS

| | | | |
|---|---|---|---|
| RE10,794 E | 1/1887 | Randolph | |
| 356,332 A | 1/1887 | Randolph | |
| 2,363,430 A | * 11/1944 | Meldahl | 384/306 |
| 2,602,713 A | * 7/1952 | Hatcher | 384/308 |
| 2,999,707 A | 9/1961 | Kniepkamp et al. | 287/85 |
| 3,161,446 A | 12/1964 | Love | 308/160 |
| 3,197,264 A | 7/1965 | Hill | 308/160 |
| 3,201,184 A | 8/1965 | Hill | 308/160 |
| 3,565,498 A | * 2/1971 | Leopold et al. | 384/306 X |
| 3,829,180 A | * 8/1974 | Gardner | 384/306 |
| 4,025,135 A | 5/1977 | Hishida | 308/194 |
| 4,199,859 A | 4/1980 | Swavely | 29/526 |
| 4,421,588 A | 12/1983 | Davies | 156/308.2 |
| RE32,595 E | 2/1988 | Davies | 156/308 |
| 4,917,963 A | * 4/1990 | Kittler | 428/610 |
| 5,021,259 A | 6/1991 | Singelyn | 427/115 |
| 5,567,057 A | * 10/1996 | Boller | 384/307 X |
| 5,568,983 A | 10/1996 | Wilson | 384/295 |
| 5,766,690 A | * 6/1998 | Derby et al. | 427/450 |
| 5,829,338 A | * 11/1998 | Chrestoff et al. | 417/269 X |
| 6,005,214 A | * 12/1999 | Cramer | 219/69.12 |
| 6,012,900 A | * 1/2000 | Kennedy et al. | 415/170.1 |
| 6,087,022 A | * 7/2000 | Burris et al. | 428/212 |

FOREIGN PATENT DOCUMENTS

| | | | |
|---|---|---|---|
| GB | 2 136 439 A | 9/1984 | C08L/71/00 |
| GB | 2 313 632 A | 12/1997 | F16C/33/20 |

OTHER PUBLICATIONS

"Thermal Spraying: Practice, Theory, and Application", American Welding Society, Inc., 1985.

Liao, H. et al. "On The Microstructures Of Thermally Sprayed "PEEK" Polymer" pp. 25–29, Proceedings on the 15$^{th}$ International Thermal Spray Conference, May 25–29, 1998, Nice France.

Jonathan Pledger, "Getting PEEK Performance Out Of Pump Components" pp. 69–71, Engineering Material, Machine Design, Jul. 23, 1998.

* cited by examiner

*Primary Examiner*—Edward K. Look
*Assistant Examiner*—Dwayne J. White

(57) ABSTRACT

In a pumping system, a PEEK composite material may be applied to wear areas on internal components. Typically, the internal component provides a metallic substrate which is prepared with a metallic bonding layer arc sprayed onto its surface, at least at the wear area. A powderized PEEK composite material is heated and propelled against the substrate and bonding layer by a high velocity oxy fuel technique. This uniformly coats the substrate providing a durable wear surface for prolonging component life.

19 Claims, 3 Drawing Sheets

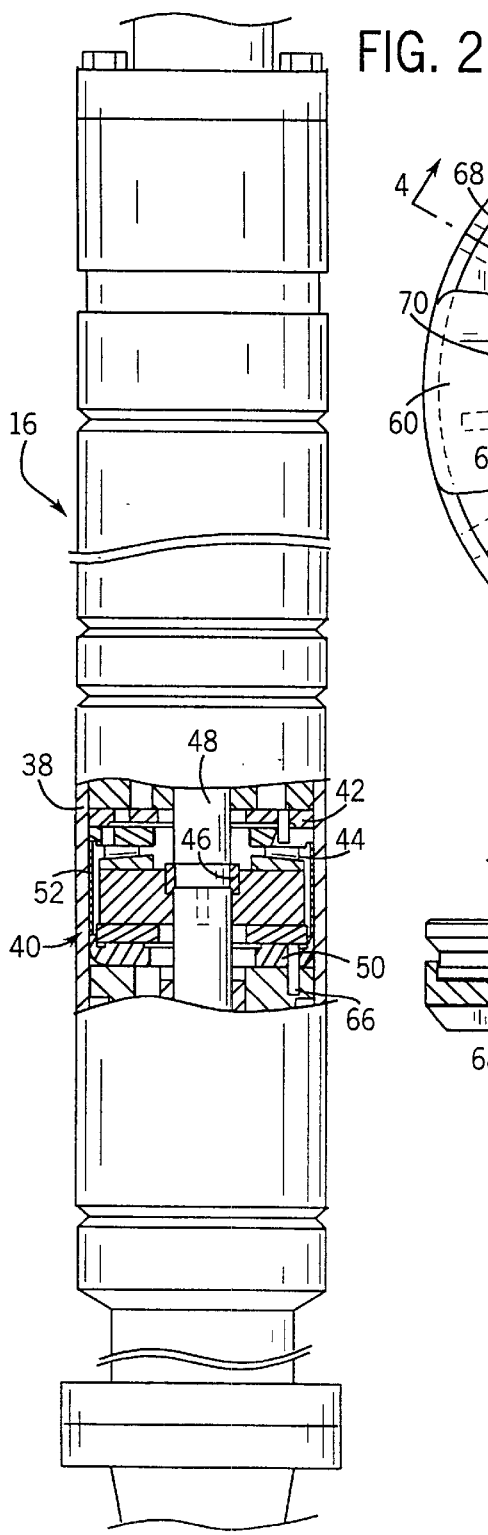
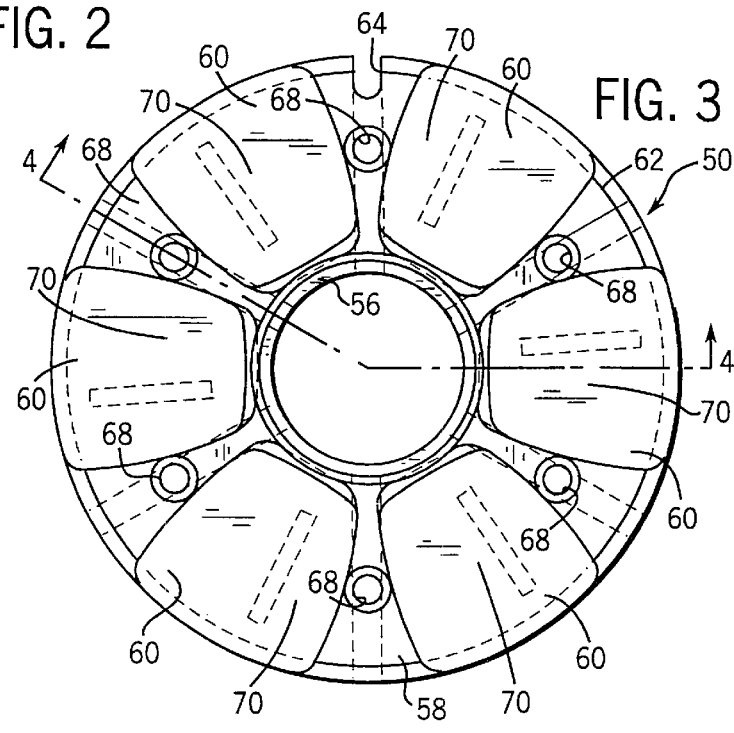
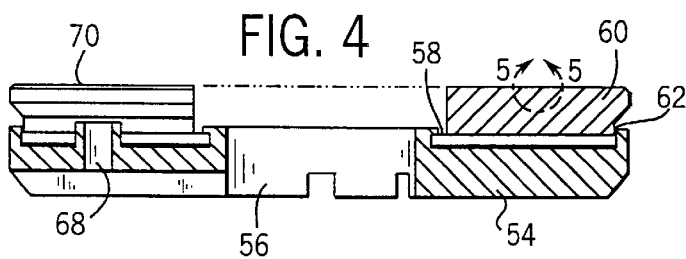
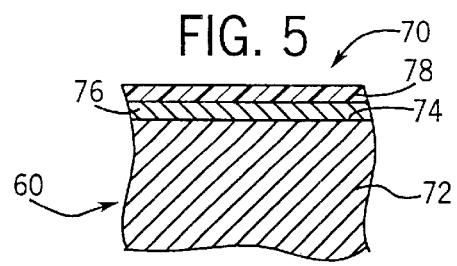

SUBMERGIBLE PUMPING SYSTEM WITH THERMAL SPRAYED POLYMERIC WEAR SURFACES

This application is a continuation of 09/159,132 filed Sep. 23, 1998 now U.S. Pat. No. 6,012,900.

FIELD OF THE INVENTION

The present invention relates generally to polymeric coated wear surfaces, and particularly to wear surfaces in a submergible pumping system in which a polymeric material, such as a PEEK composite material, is bonded to the wear surface.

BACKGROUND OF THE INVENTION

Pumping systems, such as submergible and horizontal pumping systems, are utilized in pumping oil and/or other production fluids from producing wells. A typical submergible pumping system, for example, includes components, such as a motor, motor protector and a centrifugal pump. Each of these components has moving parts that are subject to wear. This is particularly true in the relatively harsh downhole environment in which many submergible pumping systems are used.

A variety of surfaces, such as thrust bearing surfaces in the motor protector and/or centrifugal pump are subject to substantial wear. Similarly, other surfaces in the centrifugal pump, such as the impeller and diffuser vanes, the backwash area on the diffuser, impeller skirt, impeller balance ring, the diffuser wall, the diffuser bore and the hubs of the impellers are susceptible to wear. This is particularly true due to grit, such as sand, that often is found suspended in the production fluid.

Attempts have been made to provide a coating on the components at some of these wear areas. For example, thrust bearings have been produced in which the thrust bearing pads have a layer of PEEK material molded over the bearing surface of the pad. However, this molding process is relatively expensive and not conducive to coating many surface areas, such as the surfaces along the inside of a radius or diameter and other surfaces with complex shapes.

Also, centrifugal pumps have incorporated wear rings on the impeller skirt and balance ring. Typically these wear rings are made of a more wear resistant material, however they can be fabricated of the same material as the stage. Most recently, carbon fiber reinforced PEEK rings have been fabricated for use as wear rings. These wear rings range in thickness and size depending on the centrifugal pump, however the wear rings must be of sufficient cross sectional area to withstand the physical stresses which tend to separate the wear ring from the impeller. Such wear rings typically are held in place by an interference fit which places the ring in tension. Sometimes, wear rings are retained with an adhesive bond or welding.

Having a process by which a polymeric material, specifically a PEEK composite material, could be applied to a wide variety of wear surfaces in a pumping system would be advantageous in reducing component wear. For example, it would be advantageous to allow for direct application of a bonded wear surface of PEEK to replace the common practice of mating a machined wear ring of PEEK with a machined impeller. By direct application of the PEEK wear surface, there is a greater flexibility in selecting the thickness and size of the wear surface.

SUMMARY OF THE INVENTION

The present invention features a method for protecting wear areas on internal components used in a production fluid pumping system. The method comprises. providing a PEEK composite material in powderized form. The PEEK composite material is then applied to the internal component by heating the PEEK composite material and propelling it against the internal component.

According to another aspect of the invention, a fluid pumping system is provided. The pumping system includes a plurality of wear areas, each having a metal substrate coated by a bonding layer. A surface wear layer is deposited onto the bonding layer via a multiplicity of molten platelets that form the surface wear layer upon solidification. The surface wear layer comprises a PEEK composite material.

According to another aspect of the invention, a centrifugal pump utilizes at least one diffuser and at least one impeller to create a fluid flow. A plurality of PEEK composite areas are disposed on mating surfaces of the diffuser and impeller to reduce wear due to fluid erosion, sliding surface friction and/or three body wear at that particular area. Each PEEK composite area comprises a layer of PEEK composite bonded to at least one of the diffuser or the impeller.

According to a further aspect of the invention, a thrust bearing is provided for use in a component of a pumping system. The thrust bearing includes at least one thrust pad comprising a substrate pad, typically made of a metal material. A PEEK composite layer is formed on the substrate pad by a multiplicity of PEEK composite particles forced together under high velocity at a temperature at least as high as the melting point of the PEEK composite material.

BRIEF DESCRIPTION OF THE DRAWINGS

The invention will hereafter be described with reference to the accompanying drawings, wherein like reference numerals denote like elements, and:

FIG. 2 is a partial cross-sectional view taken generally along the axis of the motor protector of FIG. 1;

FIG. 3 is a top view of a thrust bearing, according to a preferred embodiment of the present invention;

FIG. 4 is a cross sectional view taken generally along line 4—4 of FIG. 3;

FIG. 5 is an enlarged cross-sectional view taken generally at the region 5—5 of FIG. 4;

DETAILED DESCRIPTION OF THE PREFERRED EMBODIMENTS

Figure 1:
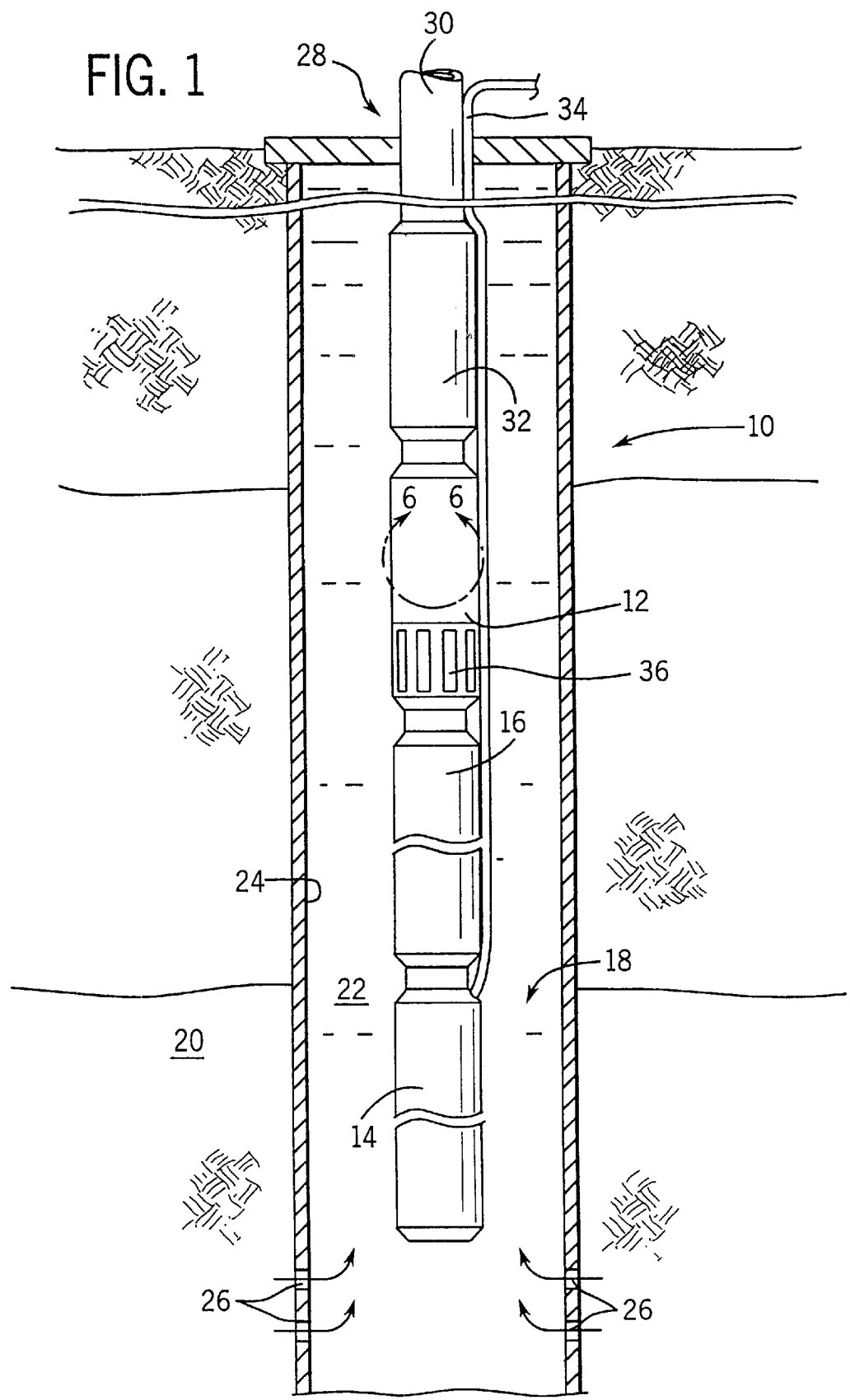
FIG. 1 is a front elevational view of an exemplary pumping system disposed within a wellbore.

Referring generally to FIG. 1, an exemplary pumping system 10, such as a submergible pumping system, is illustrated. Pumping system 10 may comprise a variety of components depending on the particular application or environment in which it is used. Typically, system 10 includes at least a centrifugal pump 12, a motor 14 and a motor protector 16.

In the illustrated example, pumping system 10 is designed for deployment in a well 18 within a geological formation 20 containing desirable production fluids, such as petroleum. In a typical application, a wellbore 22 is drilled and lined with a wellbore casing 24. Wellbore casing 24 may include a plurality of openings 26 through which production fluids may flow into wellbore 22.

Pumping system 10 is deployed in wellbore 22 by a deployment system 28 that may have a variety of forms and configurations. For example, deployment system may comprise tubing 30 connected to pump 12 by a connector 32. Power is provided to submergible motor 14 via a power cable 34. Motor 14, in turn, powers centrifugal pump 12 which draws production fluid in through a pump intake 36 and pumps the production fluid to the surface via tubing 30.

It should be noted that the illustrated submergible pumping system 10 is merely an exemplary embodiment. Other components can be added to the system, and other deployment systems may be implemented. Additionally, the production fluids may be pumped to the surface through tubing 30 or through the annulus formed between deployment system 28 and wellbore casing 24. In any of these configurations of submergible pumping system 10, it is desirable to attain the benefits of protected wear surfaces in accordance with the present invention.

Referring to FIGS. 2–8, preferred embodiments of the present invention are described. These embodiments are examples of how polymer coatings, such as PEEK composite coatings, can be utilized on a variety of components, that are subject to wear, in pumping systems. For example, a PEEK composite coating, according to the present invention, can be utilized on thrust bearings used in motor protector .16 and on impeller and diffuser surfaces within centrifugal pump 12.

Referring generally to FIG. 2, motor protector 16 is illustrated with a portion of its outer housing 38 broken away to expose a thrust bearing assembly 40 disposed therein. Thrust bearing assembly 40 may include, for example, an upper lock ring 42, an upper thrust bearing 44, and a ring 46 disposed about central shaft 48. A high load thrust bearing 50 is separated from lock ring 42 by a thrust bearing spacer 52.

The arrangement of the motor protector components are generally known to those of ordinary skill in the art, and a variety of other configurations may be employed. In any event, the high load thrust bearing 50 must be designed to support relatively high loads as the internal components are rotated by shaft 48 against thrust bearing 50. Thus, the upper supporting surface of thrust bearing 50 is a prime candidate for wear. A coating of PEEK composite material, according to a preferred embodiment of the present invention, has a low coefficient of friction and excellent wear properties for use on such a wear surface.

An exemplary high load thrust bearing 50 is illustrated in FIGS. 3–5. As illustrated, thrust bearing 50 includes a carrier ring 54 having a central aperture 56 through which shaft 48 extends. Carrier ring 54 includes a recessed area 58 for receiving a plurality of thrust pads 60. Thrust pads 60 are held in recessed area 58 by a retaining ring 62. Furthermore, carrier ring 54 includes a slot 64 for receiving an anti-rotation pin 66 to prevent rotational movement of thrust bearing 50. Carrier ring 54 also includes a plurality of oil circulation holes 68 disposed therethrough. A top surface 70 of each thrust pad 60 acts as the loading area. Accordingly, top surface 70 of each thrust pad 60 serves as a prime area for application of a PEEK composite coating according to a preferred embodiment of the present invention.

As illustrated in FIG. 5, each pad 60 includes a substrate material or pad 72. Pad 72 is made of PH17-4 stainless steel, however, other metals and materials potentially may be used in the construction of an appropriate substrate.

As will be more fully described below, substrate 72 preferably is prepared by providing a roughened surface 74 to which a bonding layer 76 is applied. A polymer layer, preferably a PEEK composite layer 78, is applied to substrate 72 and bonding layer 76 via a high velocity oxy fuel (HVOF) process.

This HVOF process creates PEEK composite layer 78 by rapidly accelerating molten or partially molten particles of the PEEK composite material against bonding layer 76 and substrate 72. The stream of molten or partially molten platelets that hit the bonding layer 76 form a continuous coating, typically having a lamellar structure. The durable coating has a low porosity, e.g. generally less than one percent porosity.

Another exemplary submergible pumping system component having a plurality of wear areas amenable to a durable coating of a PEEK composite, is centrifugal pump 12. Pump 12 is a centrifugal pump that uses a plurality of impellers 80 and diffusers 82 to pump production fluids. The impellers and diffusers have a plurality of wear areas that benefit from the application of a polymeric material, such as a PEEK composite material.

Figure 6:
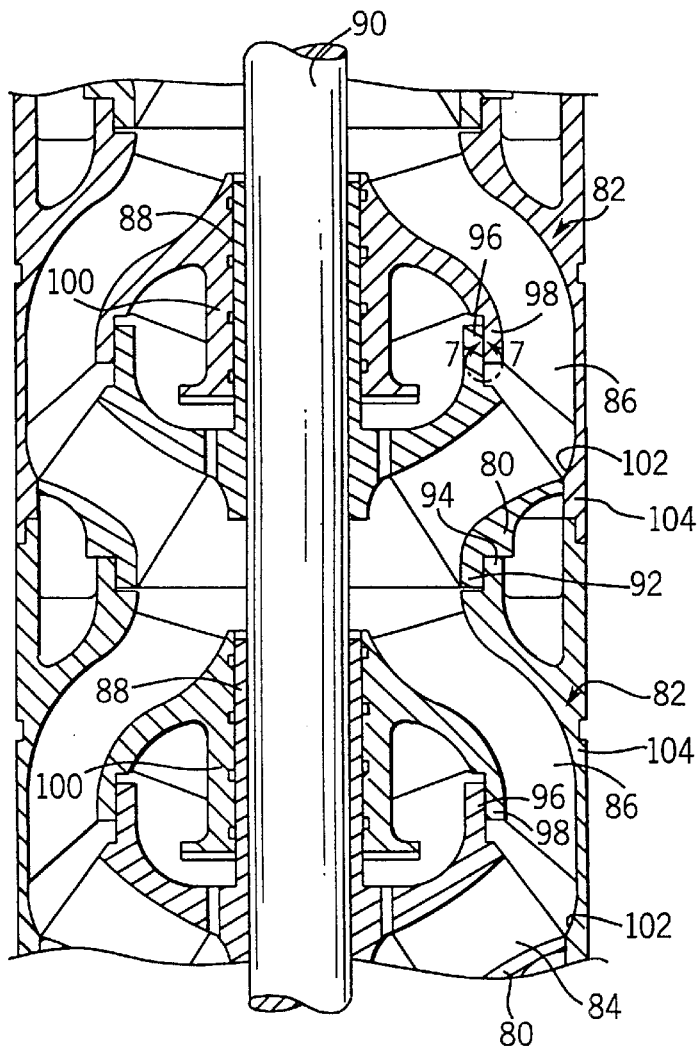
FIG. 6 is a partial cross-sectional view taken generally along line 6—6 at the submergible pump illustrated in FIG. 1.
Figure 7:
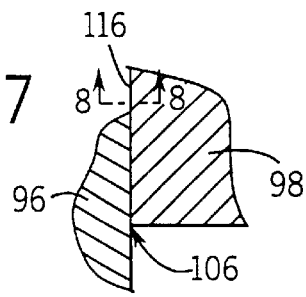
FIG. 7 is an enlarged cross-sectional view taken generally at region 7—7 of FIG. 6.

A portion of centrifugal pump 12 taken generally along line 6—6 of FIG. 1, is illustrated in cross-section in FIG. 6. As illustrated, each impeller includes an impeller vane 84 that directs a production fluid to the next sequential diffuser vane 86, as is understood by those of ordinary skill in the art. Each impeller 80 further includes an impeller hub 88 mounted to a central rotatable shaft 90. Thus, shaft 90 rotates impellers 80 within stationary diffusers 82. This configuration creates certain wear areas.

For example, each impeller includes an impeller skirt 92 that rotates inside a stationary diffuser lip 94. There is a gap between these two surfaces that allows fluid to flow between these surfaces. This fluid flow will cause erosion wear to occur on the mating surfaces 94 and 92 due to the corrosive nature of the fluid, entrained grit, cavitation, or a combination of these wear mechanisms. Also, it is possible for sliding wear to occur between surface 94 and 92 due to tight clearances.

Additionally, each impeller includes a balance ring 96 that rotates inside a corresponding support 98 of an adjacent diffuser 82, creating another wear area due to erosion, corrosion, erosion corrosion, three body wear, and/or sliding wear. A further wear area exists between each impeller hub 88 and the surrounding inner wall 100 of the corresponding diffuser 82. This area forms a journal bearing which radially supports the rotating impeller. 80 inside the stationary diffuser 82. Wear in this area can be the result of sliding surfaces or wear due to fluid flow through the operating clearance.

Wear areas also can be created independent of the sliding movement and fluid leakage of each impeller 80 with respect to its corresponding diffuser 82. For example, a wear area 102 may exist along an outer diffuser wall 104 where the production fluids exit an impeller vane 84 and impact against outer diffuser wall 104 as the production fluid is forced into the next sequential diffuser vane 86. This wear area also benefits from a durable, well-bonded coating of a polymeric material, specifically a PEEK composite material.

An exemplary wear area, which can be labeled wear area 106 is disposed between the impeller balance ring 96 and the stationary diffuser wall 98. This wear area 106 is illustrated by the enlarged cross-section of FIG. 7 taken generally along the line 7—7 of FIG. 6.

Figure 8:
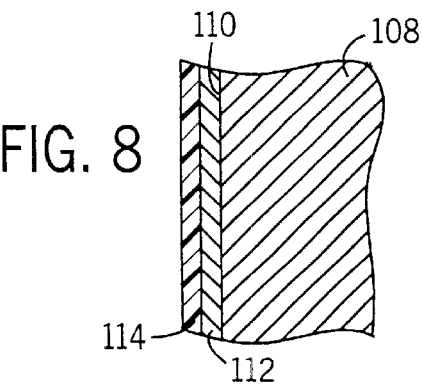
FIG. 8 is an enlarged cross-sectional view of the region 8—8 of FIG. 7.

Wear area 106 is a prime exemplary area for applying a PEEK composite coating. Potentially, a PEEK composite layer may be applied to both the inside diameter of diffuser wall 98 and the outside diameter of impeller balance ring 96 or to one of the surfaces. In either case, the balance ring 96 or the diffuser wall 98 comprises a metallic substrate 108 that preferably includes a roughened surface 110 to which a bonding layer 112 is applied as illustrated in FIG. 8. A polymer layer, specifically a PEEK composite layer 114 is applied to bonding layer 112 and substrate 108 as described above with reference to FIG. 5.

The preferred process for applying a PEEK composite material to wear areas within a submergible pumping system is described in detail below. This process permits application of a PEEK composite material to a variety of components and wear surfaces of myriad shapes. It is particularly beneficial for the application of PEEK composite material to inside radii and diameters, such as the inside diameter surface 116 of diffuser wall 98 illustrated in FIG. 7.

The preferred process for creating and applying PEEK composite layer 78 or 114 involves initial preparation of substrate layer 72, 96 or 98 for receipt of a polymer layer via a thermal spray process. In the preferred embodiment, the substrate is a metallic material, such as Ni Resist or stainless steel but other metallic materials may be appropriate depending on the specific application. A first step in the process is preparation of the substrate material. The substrate material preferably is cleaned by removing dirt, moisture, oil and other contaminants from the surface to be coated. To facilitate adherence, it is also desirable to roughen the surface to be coated. It is preferred that the surface be roughened by grit blasting. For example, the substrate may be grit blasted with aluminum oxide having a grit mesh size 28.

In another step of the process, the polymeric material is prepared for use in coating the substrate, e.g. 72, 96 or 98. It is preferred that the polymeric material have a high melting temperature, i.e., above 300° C. In the most preferred embodiment, a PEEK material is used to prepare a composite material in powdered form. Although a variety of materials may be mixed with the PEEK material, it has been determined that a preferred composite comprises a mixture of PEEK with polytetrafluoroethylene (PTFE) and carbon. These materials enhance the low coefficient of friction and excellent wear properties of PEEK.

An exemplary ratio of materials is approximately 70% PEEK mixed with approximately 20% PTFE and approximately 10% carbon. Additionally, the selection of appropriate particle size can be critical to the HVOF process. It has been determined that optimal particle sizes for the various components of the PEEK composite are approximately 70 microns for the PEEK; approximately 53 microns for the PTFE; and approximately 6 microns for the carbon particles. Although specific mixture percentages and particle sizes have been provided, other mixture ratios, particle sizes, and mixture components may be amenable to the process of the present invention.

After cleaning and grit blasting of the substrate material, e.g. 72, 96 or 98, a bonding layer, e.g. 76, 112, may be applied to the substrate. The bonding layer preferably is a metallic material having sufficient surface asperities to facilitate the mechanical bonding of the PEEK composite layer to the substrate. Preferably, a single layer of metallic material, such as nickel aluminum alloy, is applied. This material has desired characteristics at high temperature and provides excellent bonding to a stainless steel substrate. Other bonding layer materials may work better with substrates formed of materials other than stainless steel.

In the preferred embodiment, the nickel aluminum alloy is arc sprayed against the substrate. Arc spraying, as is generally known to those of ordinary skill in the art, uses a high energy electric arc generated by bringing two electrically energized wires into contact with each other. The arc energy melts the wires, and compressed air atomizes the molten material and propels it onto the substrate, leaving a bonding layer. Preferably, the bond layer has good thermal conductivity to help dissipate heat from the PEEK layer, particularly when the PEEK material is used as a bearing surface. It has been determined that an optimal thickness for the bond coat is in the range of approximately 0.014 to 0.018 inches.

Following preparation of the substrate, application of the bonding layer, and preparation of the PEEK composite material, the PEEK composite material is applied to the substrate over the bonding layer by a thermal spray. In the preferred embodiment, an HVOF process is utilized to apply the PEEK composite mixture to the substrate and the bonding layer. An optimum window of spray parameters has been established to ensure low porosity and great bond strength to permit the PEEK composite layer to be used in load bearing environments as well as protective coating environments.

Preferably, the HVOF process is carried out with the aid of a thermal spray gun, such as the Miller Thermal Spray Gun, Model HV2000, available from Miller Thermal, Inc. The Thermal Spray Gun is equipped with an axial powder feed configuration and is controlled by a Miller Thermal Computerized Console. The Thermal Spray Gun is equipped with a 12 mm combustion chamber, and the fuel gas, preferably hydrogen, to oxygen ratio is 3.33. Additionally, a carrier gas, preferably nitrogen, is flowed through the thermal spray gun at a flow rate of 30 scfh to feed powder into the combustion chamber.

The powderized PEEK composite mixture is fed to the thermal spray gun via an electronically controlled, pressurized hopper unit, as is well known to those of ordinary skill in the art. The PEEK composite material is then injected through the flame of the HVOF thermal spray gun and heated to at least the melting point of the PEEK composite material, e.g. approximately 340° C. The powder particles of the PEEK composite are partially or preferably fully melted and propelled towards the substrate and bonding layer. This creates a stream of semi-molten or molten particles or platelets that hit the substrate to form a continuous coating typically having a lamellar structure. A mechanical interlocking process takes place between the particles and the rough substrate/bonding layer to securely bond the continuous coating to the substrate.

In the preferred embodiment, the PEEK composite powder is fed at a rate of 11 grams per minute and the thermal spray gun is moved at a traverse speed of 754 millimeters per second with a standoff of 7 inches. (The standoff refers to the distance between the substrate and the outlet tip of the thermal spray gun.) The PEEK composite coating is built up in multiple passes to a thickness between approximately 0.019 inches and 0.021 inches. Typically, there is one preheat cycle and 30 passes, following which, the coating is allowed to cool by a natural slow cool.

After application of the PEEK composite mixture to form a PEEK composite layer, e.g. PEEK composite layer 78 or 114, it may be advantageous to adopt a post-deposition annealing process. The post-deposition annealing process provides a more durable coating. It facilitates the removal of the thermal history and residual stress. It also increases the level of crystallinity of the PEEK composite coating.

A preferred post-deposition annealing process comprises heating the PEEK composite layer to approximately 400° C. and holding it at that temperature for approximately 30 minutes. The PEEK composite layer (78, 114), along with the substrate (72, 96 or 98) and bonding layer (76, 112), then undergoes a controlled cooling to approximately 270° C. at which temperature it is held for approximately 10 minutes. Thereafter, the PEEK composite layer, substrate and bonding layer undergo a controlled cooling to below 60° C.

The above-described method provides a PEEK composite coating that is easily applied and has low porosity, typically on the order of less than one percent porosity. The PEEK composite layer is particularly amenable to use as a bearing surface because of its low coefficient of friction, excellent wear properties and low porosity achieved with this process.

It will be understood that the foregoing description is of preferred exemplary embodiments of this invention, and that the invention is not limited to the specific forms shown. For example, the method may be applied to a wide variety of other components; the precise mixture of constituents in the PEEK composite may be adjusted for desired applications or effects; the HVOF parameters may be adjusted according to the PEEK composite mixture, the particulate size, the type of HVOF thermal spray gun utilized and the environment in which the process is implemented; and the bonding layer material may be adjusted according to the various other parameters, including the material used in formation of the substrate. These and other modifications may be made in the design and arrangement of the elements without departing from the scope of the invention as expressed in the appended claims.

What is claimed is:

1. A thrust bearing for use in a pumping system, the thrust bearing comprising:
    a carrier ring;
    a plurality of thrust pads mounted to the carrier ring; and
    a thermally sprayed PEEK composite layer having a low porosity due to the uniform distribution of particles of PEEK via thermal spraying, the thermally sprayed PEEK composite layer being located on the plurality of thrust pads and applied by an HVOF thermal spray.

2. The thrust bearing as recited in claim 1, wherein each thrust pad comprises a metal substrate.

3. The thrust bearing as recited in claim 2, further comprising a bond layer disposed between the metal substrate and the PEEK composite layer.

4. The thrust bearing as recited in claim 3, wherein the bond layer comprises a nickel aluminum alloy.

5. The thrust bearing as recited in claim 4, wherein the bond layer is arc sprayed to the metal substrate.

6. The thrust bearing as recited in claim 5, wherein the metal substrate comprises a steel material.

7. The thrust bearing as recited in claim 6, wherein the steel material is cast.

8. A thrust bearing for use in a component of a pumping system, the thrust bearing including at least one thrust pad comprising:
    a substrate pad;
    a multiplicity of PEEK composite particles; and
    a thermally sprayed PEEK composite layer having a low porosity due to the uniform distribution of PEEK particles located on the substrate pad and applied via a multiplicity of PEEK composite particles forced together under high velocity at a temperature at least as high as the melting point of the PEEK composite particles.

9. The thrust bearing as recited in claim 8, further comprising a metallic bond layer applied to the substrate to facilitate adherence of the PEEK composite layer to the substrate pad.

10. The thrust bearing as recited in claim 9, wherein the metallic bond layer comprises an arc spray coating of a nickel aluminum alloy.

11. The thrust bearing as recited in claim 9, wherein the substrate pad comprises a steel casting.

12. The thrust bearing as recited in claim 9, wherein the multiplicity of PEEK composite particles comprises a mixture of PEEK particles, PTFE particles and carbon particles.

13. A system for applying PEEK to a thrust bearing for use in a pumping system, the system comprising:
    a carrier ring;
    a plurality of thrust pads mounted to the carrier ring; and
    a means for applying a multiplicity of heated PEEK composite particles to the thrust pads such that the PEEK composite particles form a PEEK composite layer.

14. The system of claim 13, wherein each thrust pad comprises a metal substrate.

15. The system of claim 14, further comprising a bond layer disposed between the metal substrate and the PEEK composite layer.

16. The system of claim 15, wherein the bond layer comprises a nickel alloy.

17. The system of claim 16, wherein the bond layer is arc sprayed to the metal substrate.

18. The system of claim 17, wherein the metal substrate comprises a steel material.

19. The system of claim 18, wherein the steel material is cast.

* * * * *